Patented Feb. 15, 1938

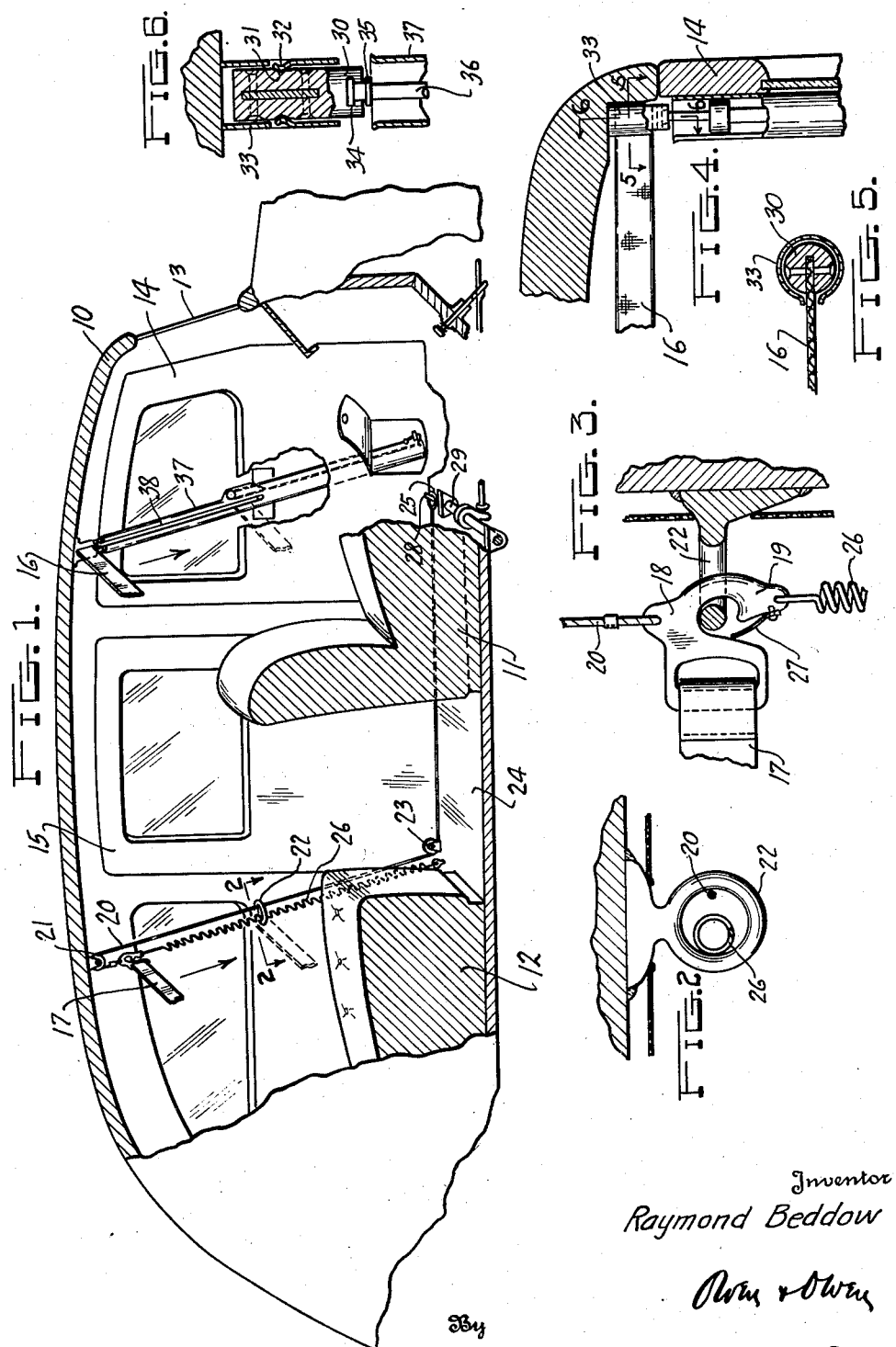

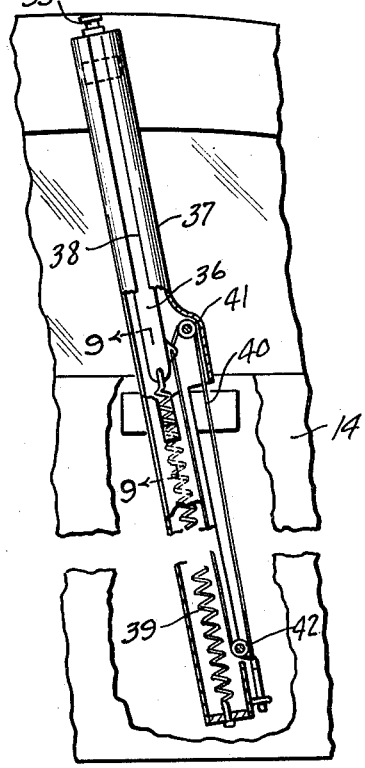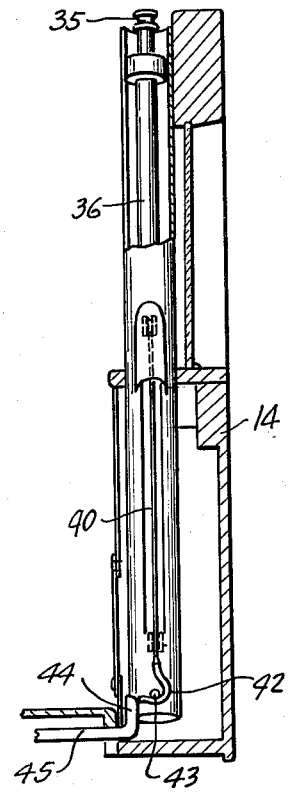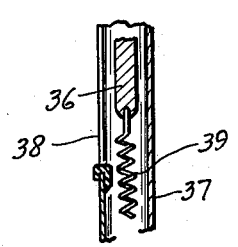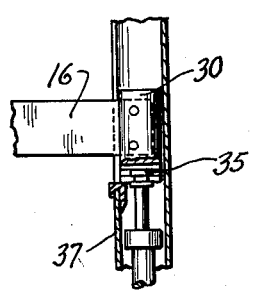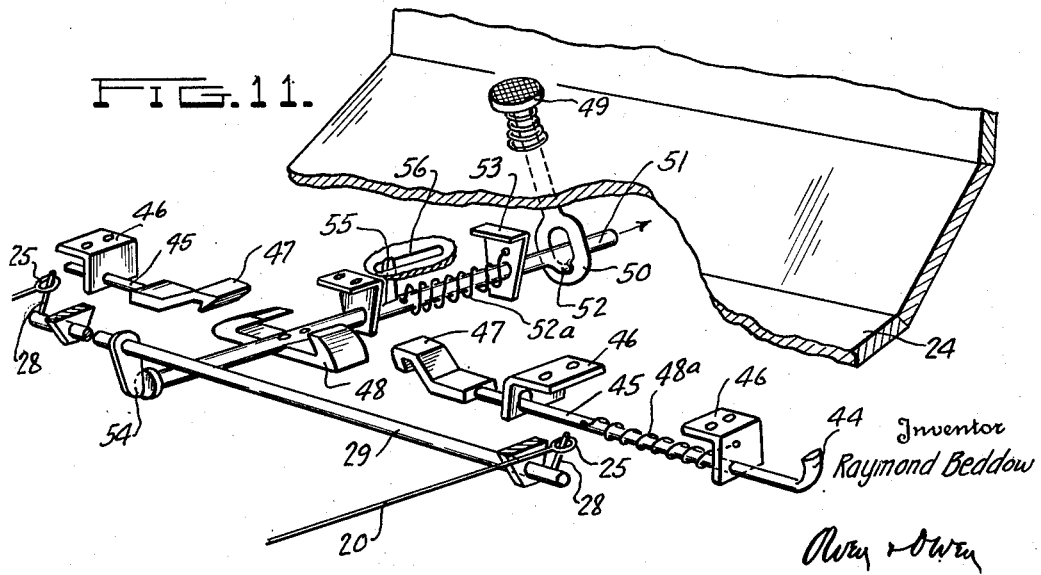

2,108,303

UNITED STATES PATENT OFFICE 2,108,303

SAFETY DEVICE FOR AUTOMOBILES

Raymond Beddow, Toledo, Ohio

Application November 25, 1936, Serial No. 112,755

1 Claim. (Cl. 280—150)

This invention relates to safety devices for automobiles but more particularly to a device for preventing the occupants of the automobile from being thrown or catapulted from the seat in the event of a collision or a sudden stopping of the vehicle and an object is to produce a new and improved device of this character which can be abruptly moved into position of use in a simple and convenient manner when occasion demands but which is normally out of the way of the occupants, so as not materially to interfere with the vision nor the operation of the car.

An embodiment of the invention is shown by way of illustration on the accompanying drawings in which:

Figure 1 is a vertical sectional elevation of a portion of an automobile body showing the safety belt device for the front and rear seats thereof;

Fig. 2 is an enlarged transverse sectional view on the line 2—2 of Fig. 1;

Fig. 3 is an enlarged sectional view of one of the mountings for the belt for the rear seat, showing it in position of use;

Fig. 4 is an enlarged vertical section showing the mounting for one end of the belt for the front seat in position occupied when in inoperative position;

Fig. 5 is an enlarged transverse sectional view on the line 5—5 of Fig. 4;

Fig. 6 is an enlarged vertical section on the line 6—6 of Fig. 4;

Fig. 7 is an elevation partly in section of the guide and operating mechanism for the belt for the front seat;

Fig. 8 is a view of the parts shown in Fig. 7 showing particularly the trip mechanism;

Fig. 9 is a sectional view on the line 9—9 of Fig. 7;

Fig. 10 is a detailed sectional view showing the mounting of the belt for the front seat in inoperative position, and Fig. 11 is a perspective view of the control mechanism by which both the front and rear belts can be released.

The illustrated embodiment of the invention comprises an automobile body 10 having a front seat 11 and a rear seat 12, a windshield 13 and front and rear doors 14 and 15 respectively. A flexible belt 16 is provided for the front seat and a flexible belt 17 is provided for the rear seat. As will hereinafter appear, a single means is provided for releasing both belts 16 and 17 so that in the event of a collision or sudden stopping of the car, both belts can be abruptly snapped into position of use directly in front of the respective seats so that the occupants thereof will not be thrown therefrom. The advantage of this device will be apparent in that many accidents of a serious nature are caused by persons being thrown from their seats either against the windshield or against other parts of the vehicle. By holding the occupants to their seats at the time of an accident, many injuries which otherwise would be caused would be eliminated.

The belt 17 for the rear seat 12 is connected at each end to a mounting 18 which has a hook portion 19. A cable 20 is connected to one portion of the mounting 18 and passes upwardly over a sheave 21, thence downwardly through a guide loop 22 to a sheave 23 which is secured to the floor 24 of the vehicle and thence forwardly to a ring 25. It will be understood that the cable 20 is provided on opposite sides of the vehicle but a description of the mechanism on one side is deemed sufficient.

In opposed relation to the point where the cable 20 is connected to the mounting 18 is a coil spring 26 which extends also through the guide loop 22 and is anchored at its lower end to the floor 24 of the body. Normally, the belt is held in its raised position but when the cable 20 is released it causes a spring 26 to abruptly move the belt downwardly until the hook 19 hooks over the guide loop 22, a leaf spring 27 retaining the hooked portion in position. It will be observed that the loop portion 22 is secured to a side of the vehicle and extends outwardly therefrom.

The rings 25 which are connected to the forward end of the cable 20 engage pins 28 which are fixed to and extend outwardly from a rod 29. By rocking the rod 29 sufficiently, it will be apparent that the rings 25 are released.

The belt 16 for the front seat 11 is secured at each end to a metal cylinder 30 which has an annular groove 31 into which resilient fingers 32 on a tube 33 are adapted to fit. The tube 33 is secured to the upper portion of the body frame above the seat 11. In the bottom end portion of the cylinder 30 is a slot 34 which extends in a direction transversely of the vehicle body to receive a similarly shaped head 35 which is secured to a rod 36 which is movable vertically and is mounted on a vertically disposed elongate tube 37 which is secured to the adjacent front door 14. On the inner side of the tube 37 is a slot 38 which extends approximately one-half the length of the tube and is adapted to accommodate the belt 16 so that the belt can move upwardly or downwardly of the tube along with the cylinder 30 and rod 36. It will be understood that when the door 14 is opened, the cylinder 30 is operated from the rod 36 because of the slot 34 through which the head 35 of the rod 36 can move upon opening or closing movements of the door.

Secured to the lower end of the rod 36 is a coil spring 39, the lower end of which is anchored to the lower end of the tube 37. Secured to the lower end of the rod 36 is an endless cable 40 which is trained about vertically spaced sheaves 41 and 42 and which is in its lowermost position when the belt 16 is raised to inoperative position, at which time the spring 39 is placed under tension. When the hook is in this position, it is engageable with a pin 43. The hook 42 is substantially L-shaped and the end portion is engageable by the upturned end 44 of a rod 45 which is guided in suitable brackets 46. A hook 47 on the opposite end of the rod is engageable with a double hook member 48. A coil spring 48ª normally urges the rod 45 toward the hook 42 to move it from the pin 43. It is to be understood that a similar device is mounted on each of the front doors of the body but description of one is deemed sufficient.

As above mentioned, both belts 16 and 17 are simultaneously released and for this purpose, a foot button or pedal 49 extends through the floor 24. Connected with the lower end of the pedal is an elongate loop member 50 through which a rod 51 extends. On the rod 51 is a stop 52 which normally engages the side of the loop member 50. By depressing the pedal 49, longitudinal movement of the rod 51 is permitted. A coil spring 52ª connected at one end to the rod 51 and at the other end to a stationary bracket 53, imparts movement to the rod. To the rod 51 is connected the double hook member 48, and it will be seen by such movement, that hooks 47 are released so that the upturned end 44 of the rod 45 engages the hook 42 and moves the latter away from the pin 43. Thereupon, the spring 39 is released so that the belt 16 can be snapped abruptly downwardly into position of use. At the same time, the belt 16 is released, the belt 17 is also released, since one end of the rod 51 is normally disposed against an arm 54 which is fixed to the rod 29. Obviously, by moving the rod 51 away from the arm 54, the rod 29 can be turned to release the rings 25 from the pins 28. As above described, this operates to release the rear belt 17.

It will be understood that the parts can be returned to their normal position and to assist in so doing, a finger 55 is fixed to the rod 51 and extends upwardly through a slot 56 in the floor 24 of the vehicle. By engaging the rings 25 of the pins 28 moving the rod 51 to the left of Fig. 11 and then moving the hooks 47 into engagement with the double hook member 48 and hooking the hooks 42 over the pins 43, it will be seen that the parts will again be in position to be tripped.

It is to be understood that changes in details of construction, arrangement and operation may be effected without departing from the spirit of the invention especially as defined in the appended claim.

What I claim is:

A safety device for automobiles comprising, in combination with a closed body having a front seat, windshield and side doors, a safety belt adapted to be disposed when in use in position between the windshield and seat, spring means carried by each door for urging said belt to position of use, means providing a separable connection between said spring means and belt enabling separation of these parts upon opening of the door, a catch controlling said spring means, and means for releasing said catch to render said spring means operative.

RAYMOND BEDDOW.